(12) United States Patent
Qian (10) Patent No.: US 12,517,556 B2
(45) Date of Patent: Jan. 6, 2026

(54) COVER STRUCTURE, MANUFACTURING METHOD THEREFOR, DISPLAY DEVICE, AND WEARABLE DEVICE CAPABLE OF DISPLAYING

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Zhengkun Qian, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 387 days.

(21) Appl. No.: 18/023,867

(22) PCT Filed: Feb. 24, 2022

(86) PCT No.: PCT/CN2022/077662
§ 371 (c)(1),
(2) Date: Feb. 28, 2023

(87) PCT Pub. No.: WO2023/159421
PCT Pub. Date: Aug. 31, 2023

(65) Prior Publication Data
US 2024/0288905 A1    Aug. 29, 2024

(51) Int. Cl.
*G06F 1/16* (2006.01)
*C03C 15/00* (2006.01)

(52) U.S. Cl.
CPC ............ *G06F 1/1656* (2013.01); *C03C 15/00* (2013.01); *G06F 1/163* (2013.01); *C03C 2204/08* (2013.01)

(58) Field of Classification Search
CPC ....... G06F 1/163; G06F 1/1656; C03C 15/00; C03C 2204/08
See application file for complete search history.

(56) References Cited

U.S. PATENT DOCUMENTS

2020/0051466 A1* 2/2020 Inoue ................... G06F 1/1601

FOREIGN PATENT DOCUMENTS

| CN | 203460491 U | 3/2014 |
|---|---|---|
| CN | 204086831 U | 1/2015 |

(Continued)

*Primary Examiner* — Daniel Petkovsek
(74) *Attorney, Agent, or Firm* — WHDA, LLP (57) ABSTRACT

Disclosed are a cover structure, a method for manufacturing the same, a display device, and a wearable device capable of displaying. The cover structure includes: a cover, the cover having an optical transparent region and an edge region disposed around a periphery of the optical transparent region, the edge region at one side of the cover having a sunken step, the sunken step is disposed around the periphery of the optical transparent region, the surface of the sunken step has a first microstructure, the first microstructure including at least one of a first protrusion and a first recess. In the cover structure, a display module can display through the optical transparent region, the fitting and installation of the cover and the frame are facilitated by the sunken step, and the surface of the sunken step has the first microstructure.

16 Claims, 6 Drawing Sheets

(56) References Cited

FOREIGN PATENT DOCUMENTS

| | | |
|---|---|---|
| CN | 104924623 A | 9/2015 |
| CN | 104933970 A | 9/2015 |
| CN | 105916317 A | 8/2016 |
| CN | 107809502 A | 3/2018 |
| CN | 107948366 A | 4/2018 |
| CN | 111446409 A | 7/2020 |
| CN | 111965871 A | 11/2020 |
| CN | 114531774 A | 5/2022 |
| JP | S54-47681 A | 4/1979 |
| WO | WO-2021231915 A1 * 11/2021 ........... G06F 1/1626 |

* cited by examiner

COVER STRUCTURE, MANUFACTURING METHOD THEREFOR, DISPLAY DEVICE, AND WEARABLE DEVICE CAPABLE OF DISPLAYING

CROSS-REFERENCE TO RELATED APPLICATIONS

The present application is the U.S. national phase of PCT Application. No. PCT/CN2022/077662 filed on Feb. 24, 2022, the disclosure of which is hereby incorporated by reference in its entirety.

TECHNICAL FIELD

The present disclosure relates to the technical field of displays, and in particular to a cover structure and a manufacturing method therefor, a display device, and a wearable device capable of displaying.

BACKGROUND

Currently, there is an extremely high waterproofing requirement for the wearable product, which in turn results in a need for a better tightness during assembly of the overall product and module. The middle frame of the overall product and the module are generally attached by sticking an edge of the middle frame to the cover, but the whole process from the cover leaving a factory, to the assembly to the module, and then to the manufacturing of the overall product takes a long time. Factors such as the poor control of pollutants cause a decrease in the dyne value of the cover which is irreversible, and it is difficult to ensure the high waterproof requirement for the overall product.

SUMMARY

In a first aspect, an embodiment of the present disclosure provides a cover structure, applied to a display device, including:
a cover, the cover having an optical transparent region and an edge region disposed around a periphery of the optical transparent region, the edge region at one side of the cover having a sunken step, the sunken step being disposed around the a periphery of the optical transparent region, a surface of the sunken step having a first microstructure, the first microstructure comprising at least one of a first protrusion and a first recess.

Optionally, a surface of the optical transparent region at one side of the cover has a second microstructure, the second microstructure includes at least one of a second protrusion and a second recess.

Optionally, a dyne value of the surface of the optical transparent region at the one side of the cover is greater than or equal to 32 A.

Optionally, an optical film layer is disposed on the surface of the optical transparent region at the one side of the cover.

Optionally, the first microstructure has $K_2SiF_6$.

Optionally, an ink layer is disposed at a region corresponding to the sunken step at the other side of the cover.

In a second aspect, an embodiment of the present disclosure provides a method for manufacturing a cover structure, including:
providing a substrate, the substrate having an optical transparent region and an edge region disposed around a periphery of the optical transparent region;
forming a sunken step in the edge region at one side of the substrate, the sunken step being disposed around the periphery of the optical transparent region; and
forming a first microstructure on a surface of the sunken step, the first microstructure including at least one of a first protrusion and a first recess.

Optionally, the step of forming a first microstructure on a surface of the sunken step includes:
etching the surface of the sunken step with an etching solution to form the first microstructure;
where the etching solution includes hydrofluoric acid, concentrated sulfuric acid, ammonium bifluoride, and ammonium sulfate.

Optionally, before the step of etching the surface of the sunken step with an etching solution to form the first microstructure, the method further includes:
forming a protective layer on the optical transparent region at a side of the substrate;
after the step of etching the surface of the sunken step with an etching solution to form the first microstructure, the method further includes: removing the protective layer.

Optionally, a mass ratio for the hydrofluoric acid, the concentrated sulfuric acid, the ammonium bifluoride and the ammonium sulfate in the etching solution is in (2-4):(2-4):(4-7):(0.5-2).

Optionally, the etching solution further includes:
an inorganic salt, the inorganic salt including at least one of a sodium salt and a potassium salt, wherein a mass percentage of the inorganic salt in the etching solution is in 3% to 30%.

Optionally, the method further includes:
forming a second microstructure on the surface of the optical transparent region at the one side of the substrate, the second microstructure including at least one of a second protrusion and a second recess.

Optionally, before the step of etching the surface of the sunken step with an etching solution to form the first microstructure, the method further includes:
polishing the surface of the sunken step.

Optionally, the method further includes:
forming an ink layer in a region corresponding to the sunken step at the other side of the substrate.

In a third aspect, an embodiment of the present disclosure provides a display device, including a cover structure, the cover structure including:
a cover, the cover having an optical transparent region and an edge region disposed around a periphery of the optical transparent region, the edge region at one side of the cover having a sunken step, the sunken step being disposed around the periphery of the optical transparent region, a surface of the sunken step having a first microstructure, the first microstructure including at least one of a first protrusion and a first recess.

Optionally, the display device further includes:
a frame, wherein the frame has an annular fitting hole, an inner side wall of the fitting hole has a limiting step, the limiting step is arranged around a periphery of the fitting hole, the frame is disposed on the cover through the fitting hole, the limiting step is arranged opposite to the sunken step, and an adhesive layer is disposed between a surface of the sunken step and a surface of the limiting step at a side facing the sunken step.

Optionally, a surface of the optical transparent region at the one side of the cover has a second microstructure, the second microstructure including at least one of a second protrusion and a second recess; and/or a dyne value of the surface of the optical transparent region at the one side of the cover is greater than or equal to 32 A; and/or an optical film layer is disposed on the surface of the optical transparent region at the one side of the cover; and/or the first microstructure has $K_2SiF_6$; and/or an ink layer is disposed at a region corresponding to the sunken step at the other side of the cover.

In a fourth aspect, an embodiment of the present disclosure provides a wearable device capable of displaying, including a cover structure, the cover structure including:

a cover, a shape of the cover being circular, the cover having an optical transparent region and an edge region disposed around a periphery of the optical transparent region, the edge region at one side of the cover having an anular sunken step, the sunken step being disposed around the periphery of the optical transparent region, a surface of the sunken step having a first microstructure, the first microstructure including at least one of a first protrusion and a first recess.

REFERENCE NUMERALS

Cover 10; Sunken step 11; First protrusion 12; First recess 13;
Optical film layer 20; Ink layer 21;
Frame 30; Limiting step 31; Fitting hole 32.

DETAILED DESCRIPTION

Hereinafter, a cover structure according to embodiments of the present disclosure will be described in detail with reference to specific embodiments and application scenarios thereof as shown in FIGS. 1 to 10.

As shown in FIGS. 1 to 6, an embodiment of the present disclosure provides a cover structure, applied to a display device. The cover structure includes: a cover 10, the cover 10 has an optical transparent region and an edge region arranged around a periphery of the optical transparent region. The cover 10 may be made of a glass material, and a shape of the cover 10 may be a circle or square, and the specific shape may be selected according to an actual need. The edge region at a side of the cover 10 has a sunken step 11, namely, a thickness of a region where the sunken step 11 is located on the cover 10 is less than a thickness of the optical transparent region of the cover 10. The sunken step 11 is arranged around the periphery of the optical transparent region, for example, the cover 10 may be circular, the sunken step 11 may be annular. A surface of the sunken step 11 has a first microstructure, the first microstructure includes at least one of a first protrusion 12 and a first recess 13, for example, the first microstructure may include the first protrusion 12. There may be a plurality of first protrusions 12 and a plurality of first recesses 13, which may be uniformly distributed on the surface of the sunken step 11; the dyne value of the surface of the sunken step 11 can be effectively improved by the first microstructure, so that the sunken step 11 can be more closely fitted to the frame 30, and the sealing performance can be effectively ensured.

Figure 1:
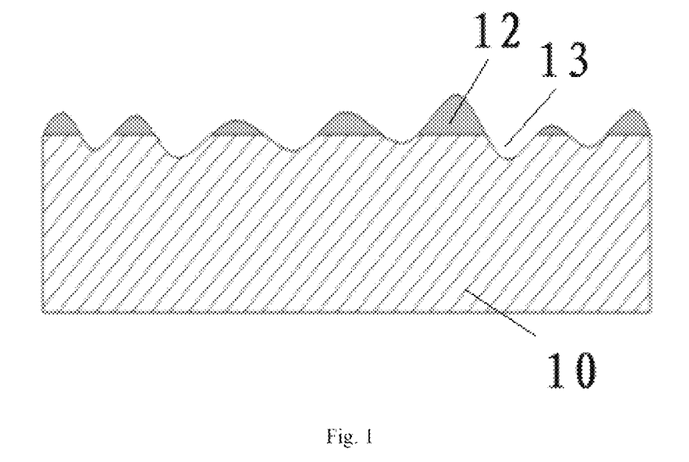
FIG. 1 is a schematic diagram of a cover structure.
Figure 2:
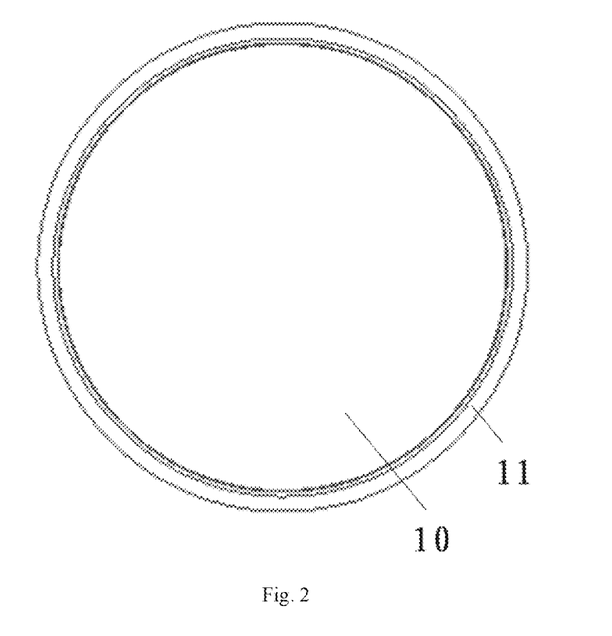
FIG. 2 is a top view of a cover.

In the cover structure according to the embodiment of the present disclosure, the cover 10 has the optical transparent region, and the display module can display in this region via the optical transparent region; the sunken step 11 is arranged to enclose the periphery of the optical transparent region, so that the fitting and installation of the cover 10 to the frame 30 can be facilitated by the sunken step 11. The surface of the sunken step 11 has the first microstructure, the first microstructure includes at least one of the first protrusion 12 and the first recess 13, so that the dyne value of the surface of the sunken step 11 can be increased by providing the first microstructure on the sunken step 11, and the sunken step 11 can be tightly fitted to the frame 30, thereby effectively improving the sealing, and the waterproof effect, and the issue of poor sealing effect caused by a polluted surface of the sunken step can be addressed.

In some embodiments, a surface of the optical transparent region at one side of the cover 10 may have a second microstructure, and the second microstructure may include at least one of a second protrusion and a second recess. For example, the second microstructure may include a second protrusion. There may be a plurality of second protrusions and a plurality of second recesses which may be uniformly distributed on the optical transparent region of one side of the cover 10. The dyne value of the surface of the optical transparent region at the one side of the cover 10 can be effectively increased by the second microstructure, so that an optical film layer can be closely adhered to the surface of the optical transparent region at the one side of the cover 10.

In some other embodiments, the dyne value of the surface of the optical transparent region at the one side of the cover 10 may be greater than or equal to 32 A, so that the optical film layer can be e closely adhered to the surface of the optical transparent region of one side of the cover 10, thereby ensuring the stability and robustness of the adhesion.

Figure 3A:
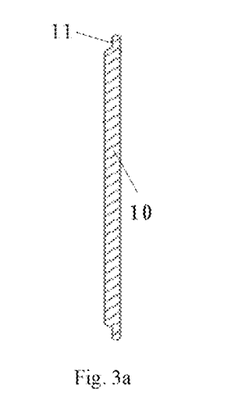
FIG. 3a is a side view of the cover.
Figure 3B:
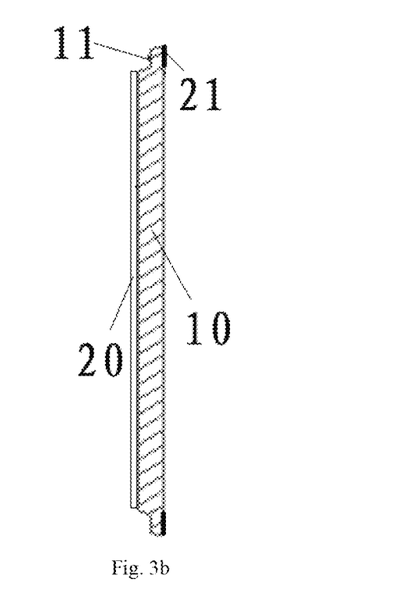
FIG. 3b is another side view of the cover.

In an embodiment of the present disclosure, as shown in FIG. 3b, the surface of the optical transparent region at the one side of the cover 10 may be provided with an optical film layer 20, and the optical film layer 20 may include an anti-fingerprint film layer or an anti-reflection layer, for example, the optical film layer 20 may be an anti-reflection layer for reducing light reflection.

Optionally, as shown in FIG. 1, the first microstructure may have $K_2SiF_6$ therein. For example, the first microstructure includes a first protrusion 12 and a first recess 13, and the first protrusion 12 may be formed by $K_2SiF_6$. As the $K_2SiF_6$ is relatively stable and cannot be easily damaged, having $K_2SiF_6$ in the first microstructure can make the first microstructure stable and not easily being damaged.

Optionally, as shown in FIG. 3b, a region corresponding to the sunken step 11 at the other side of the cover 10 may be provided with an ink layer 21, and the ink layer 21 may serve as a light-shielding layer which prevents light from being transmitted therethrough.

An embodiment of the present disclosure provides a method for manufacturing a cover structure, including:
providing a substrate, the substrate having an optical transparent region and an edge region arranged around a periphery of the optical transparent region, wherein the substrate may be made of a glass material, a shape of the substrate may be circle or square; the specific shape may be selected according to an actual need; the display module can display through the optical transparent region;
forming a sunken step 11 in an edge region at one side of the substrate, the sunken step 11 being disposed around a periphery of the optical transparent region; for example, the substrate may be circular shaped and the sunken step 11 may be annular shaped; forming a first microstructure on the surface of the sunken step 11, wherein the first microstructure may include at least one of a first protrusion 12 and a first recess 13. By providing the first microstructure on the sunken step 11, the dyne value of the surface of the sunken step 11 can be increased, so that the sunken step 11 can be fitted to the frame 30 more tightly, the tightness can be effectively ensured, the waterproof effect can be improved, and the issue of poor sealing effect due to a polluted surface of the sunken step can be addressed.

In some embodiments, the step of forming a first microstructure on the surface of the sunken step 11 may include:
etching the surface of the sunken step 11 with an etching solution to form the first microstructure;
wherein the etching solution may include hydrofluoric acid, concentrated sulfuric acid, ammonium bifluoride, and ammonium sulfate. The solvent in the etching solution may be deionized water. Other solvent may also be used, which can be selected according to an actual situation. No micro-crack will be generated after the chemical reaction with the etching solution, and thus there is no influence on the strength of the sunken step 11.

In some other embodiments, before the step of etching the surface of the sunken step 11 by an etching solution to form the first microstructure, the method may further include:
forming a protective layer on the optical transparent region at one side of the substrate; the protective layer can prevent the etching solution from damaging the optical transparent region at the one side of the substrate, and the protective layer may be paraffin or an acid-resistant protective film;
after the step of etching the surface of the sunken step 11 by an etching solution to form the first microstructure, the method further includes: removing the protective layer.

Figure 8A:
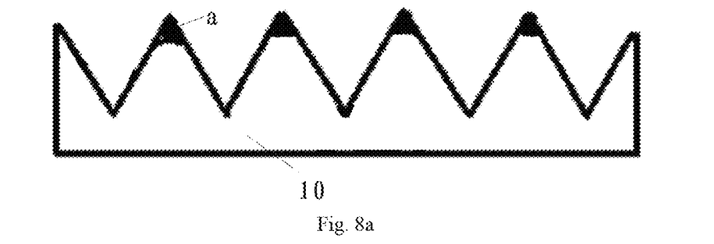
FIG. 8a is a schematic diagram showing a surface structure of a sunken step after being etched with an etching solution.
Figure 8B:
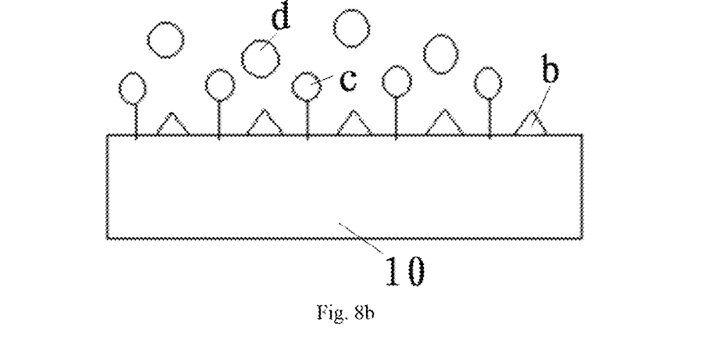
FIG. 8b is a schematic diagram showing another surface structure of a sunken step after being etched with an etching solution.

Optionally, a mass ratio of the hydrofluoric acid, the concentrated sulfuric acid, the ammonium bifluoride and the ammonium sulfate in the etching solution is in (2-4):(2-4):(4-7):(0.5-2). For example, the mass ratio of the hydrofluoric acid, the concentrated sulfuric acid, the ammonium bifluoride and the ammonium sulfate in the etching solution is 3:3:6:1, the solvent in the etching solution may be deionized water, and the hydrofluoric acid:the concentrated sulfuric acid:the ammonium hydrogen fluoride:the ammonium sulfate:the water may be 3:3:6:1:16. Optionally, the etching solution may further include: an inorganic salt, wherein the inorganic salt may include at least one of a sodium salt and a potassium salt, for example, KCl, wherein the mass percentage of the inorganic salt in the etching solution is 3%-30%. During the preparation of the etching solution, the hydrofluoric acid:the concentrated sulfuric acid:the ammonium hydrogen fluoride:the ammonium sulfate:the water may be 3:3:6:1:16, and then different mass percentages of (0%, 7%, 14%, 20% and 25%) of KCl are added to prepare different etching solutions. The etching solutions with different mass percentages of KCl may have etched surface structures as shown in FIGS. 7a to 7e, respectively. When KCl is not added, an island structure in the scale of millimeter is formed. When KCl increases, the island structure is gradually formed. When KCl exceeds 20%, islands in the island structure are connected to each other. The formation process is shown in FIGS. 7a to 7e, a $K_2SiF_6$ precipitate is finally formed on the surface. As shown in FIGS. 8a and 8b, where c represents F atom, d represents KF, and a and b represent the $K_2SiF_6$ precipitate formed on the surface. In forming a surface having a first microstructure, the roughness of the surface of the sunken step 11 can be controlled by the concentration of the etching solution. The surface of the sunken step 11 is etched by the etching solution to form a precipitate, so that the roughness of the surface can be increased, while the surface energy and the dyne value can also be increased and thus the strength of the cover can be ensured.

The Wenzel equation in contact theory, the principle of which is explained as follows.

Figure 9:
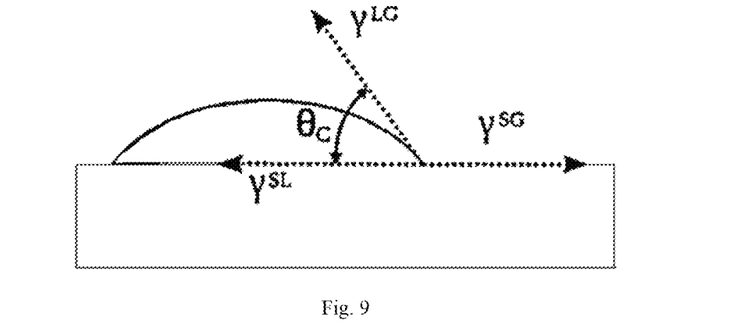
FIG. 9 is a schematic diagram of the Young's equation for the contact angle.
Figure 10:
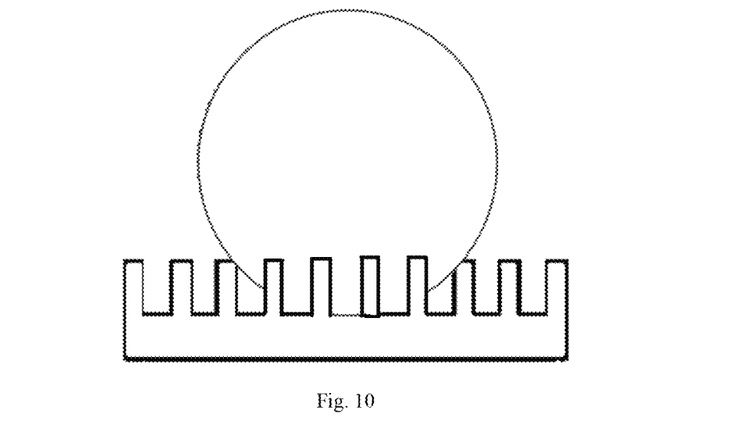
FIG. 10 is a schematic diagram of the Wenzel equation for the contact angle.

The Young's equation proposes a formula for calculating the contact angle of an ideal rigid smooth surface:

$$\gamma^{SG} = \gamma^{SL} + \gamma^{LG} \cdot \cos \theta c$$

where θc is a contact angle (an angle for water droplet) as shown in FIG. 9 below; $\gamma^{SG}$, $\gamma^{SL}$, $\gamma^{LG}$ correspond to interfacial tension for solid-gas, solid-liquid, and liquid-gas, respectively. There is no ideal smooth interface in practical situation, so the Wenzel equation is proposed on the basis of the Young's equation, which takes the solid-liquid contact angle for a rough interface into consideration. The equation is as follows:

$$\cos \theta w = \gamma \cdot \cos \theta c$$

As shown in FIG. 10, γ represents the interfacial tension, θw represents the contact angle, and it can be seen from the equation that when θc is less than 90 degrees (π/2), there is a hydrophilicity for the object; as γ (surface roughness≥1) increases, cos θw increases and θw decreases, a higher hydrophilicity present in macro aspect. When θc is greater than 90° (π/2), there is a hydrophobicity for the object; as γ (surface roughness≥1) increases, cos θw decreases and θw increases, a higher hydrophobicity present in macro aspect.

Surface energy principle: surface energy is a measure of the breaking of chemical bonds between molecules when creating a surface of a substance. In solid state physics, the surface atoms have more energy than the atoms inside the substance (because the inside atoms are in a state of force equilibrium with the surrounding atoms in space). According to the principle of minimum energy, atoms tend spontaneously to be in the interior of substance rather than the surface. It can also be simply understood that the surface atoms have additional potential energy, which is called surface energy, than the bulk atoms because the bond energy of atoms in the surface layer towards the outside is not compensated. If the surface energy of the object is high, it means that there is a needed for external particles to balance the excess bond energy of its surface, and the macroscopic behavior is to adsorb other substance such as capillarity, etc. If the surface of the cover absorbs particles such as pollutant, such pollutant particles compensate the excess bond energy of the surface particles of the cover, so that in the macro aspect, the dyne value of the surface of the cover decreases and the dyne value of the surface of the cover returns to the previous state after cleaning (because no external bond energy can compensate the bond energy of the cover, resulting in an increase in the surface energy). By exposing more atoms on the surface of the object (and increasing the surface roughness) can increase the surface energy without changing the intrinsic properties and topography of the material.

As explained in the Wenzel equation that if the surface is hydrophilic, a certain increase in the surface roughness can make the surface more hydrophilic (for the cover, the original material of the cover is a hydrophilic material, and the angle for the water droplet is generally less than 20 degrees). From a macroscopic point of view, the more hydrophilic and the more active the surface is, the higher the surface energy is. It is pointed out in the surface energy principle that if the surface energy is increased without changing the component elements of the substance, there is a need for more atoms on the surface (increasing the potential energy of the surface) and an increased surface roughness. From the above two theories, it can be concluded that the desire to increase the solid surface energy (to increase the dyne value) can be achieved by altering the solid surface microstructure to make the surface rougher (the rougher is in the micro aspect).

Optionally, the method may further include: forming a second microstructure on a surface of the optical transparent region at one side of the substrate, the second microstructure includes at least one of a second protrusion and a second recess. For example, the second microstructure may include a second protrusion. There may be a plurality of second protrusions and a plurality of second recesses which may be uniformly distributed on the optical transparent region at the one side of the cover 10, and the dyne value of the surface of the optical transparent region at the one side of the cover 10 can be effectively increased by the second microstructure, so that an optical film layer can be closely adhered to the surface of the optical transparent region at the one side of the cover 10.

The second microstructure may be formed on the surface of the optical transparent region at the one side of the substrate with the above etching solution. The etching solution may be simultaneously applied to the surface for the sunken step 11 and the surface for the optical transparent region at the one side of the substrate, so as to form microstructures.

In an embodiment of the present disclosure, before the step of etching the surface of the sunken step 11 by an etching solution to form the first microstructure, the method further includes:
  polishing the surface of the sunken step 11. The surface of the sunken step 11 can be made smoother by the polishing, thereby reducing occurrence of cracks.

The micro-cracks of the surface of the sunken step 11 can be eliminated by the polishing, thereby preventing the reduction of the strength of the cover. As shown in Table 1, Table 1 shows the strength test results of the surface of the sunken step 11 at different polishing times.

TABLE 1

Cover strength test results at different polishing times

| Polishing time | Crush (minimum value) | Ball Drop (0.2 J/5 times) |
| --- | --- | --- |
| Polishing 0 min | 692.35 | NG at fourth ball drop |
| Polishing 5 min | 805.15 | OK |
| Polishing 10 min | 827.68 | OK |
| Polishing 20 min | 881.61 | OK |
| Polishing 30 min | 900.23 | OK |

It can be seen that the micro-cracks on the surface of the sunken step 11 can be eliminated by the polishing, and the strength of the cover can be improved. The chemical reaction does not generate microcracks at the surface of the sunken step 11. The surface of the sunken step 11 is polished before the surface of the sunken step 11 is etched by the etching solution to form the first microstructure, and the etching by the etching solution to form the first microstructure does not generate cracks and does not affect the strength.

In some embodiments, the manufacturing method may further include:
  forming an ink layer 21 in a region corresponding to the sunken step 11 at the other side of the substrate. The ink layer 21 may serve as a light-shielding layer, and may prevent light from being transmitted therethrough. After the step of etching the surface of the sunken step 11 by an etching solution to form the first microstructure, an ink layer 21 may be formed in a region at the other side of the substrate which corresponds to the sunken step 11, and the ink layer 21 may be formed by screen printing.

In some embodiments, the surface of the sunken step 11 may be polished first, a protective layer is formed on the optical transparent region at one side of the substrate, and the surface of the sunken step 11 is etched by an etching solution to form the first microstructure, and then the protective layer is removed.

In an embodiment of the present disclosure, an optical film layer 20 may be formed on the surface of the optical transparent region at one side of the substrate, and the optical film layer 20 may include an anti-fingerprint film layer or an anti-reflection layer, for example, the optical film layer 20 may be an anti-reflection layer for reducing the reflection of light.

A second microstructure may be formed on the surface of the optical transparent region at one side of the substrate by the above-mentioned etching solution, wherein the material of the substrate itself is a hydrophilic material, and forming the second microstructure on the surface of the optical transparent region at the one side of the substrate is beneficial to improving the density of coated layer, and the water drop angle of the surface of the substrate before coating may be less than 20 degrees. The smaller the water drop angle of the surface and the more hydrophilic is, the better the coating density. The ink layer 21 is formed in a region at the other side of the substrate corresponding to the sunken step 11, and the ink layer 21 may be formed by screen printing, and the water drop angle may be less than 20 degrees for the surface of the region where the ink layer 21 is formed. The dyne value of the optical transparent region may be greater than or equal to 32 A, and forming the microstructure on the surface of the optical transparent region at the one side of the substrate contributes to an increase in the dyne value.

An embodiment of the present disclosure provides a display device, including a cover structure. The cover structure includes: a cover 10, the cover 10 has an optical transparent region and an edge region arranged around a periphery of the optical transparent region, the edge region of one side of the cover 10 having a sunken step 11, the sunken step 11 is arranged around the periphery of the optical transparent region, and the surface of the sunken step 11 having a first microstructure, the first microstructure includes at least one of a first protrusion 12 and a first recess 13. By providing the first microstructure on the sunken step 11, the dyne value of the surface of the sunken step 11 can be increased, so that the fitting between the sunken step 11 and the frame 30 is tighter, a better sealing can be effectively realized, the waterproof effect can be improved, and the issue of poor sealing effect due to the pollutant at the sunken step surface is addressed.

Figure 4:
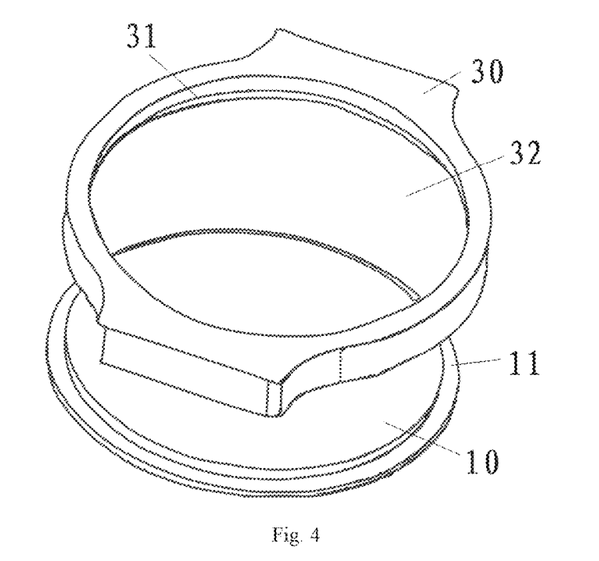
FIG. 4 is a schematic diagram of the cover fitting to a frame.
Figure 5:
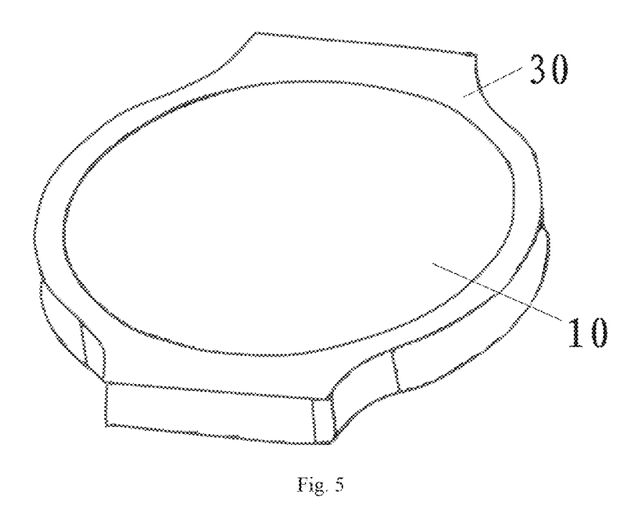
FIG. 5 is another schematic diagram of the cover fitting to the frame.
Figure 6:
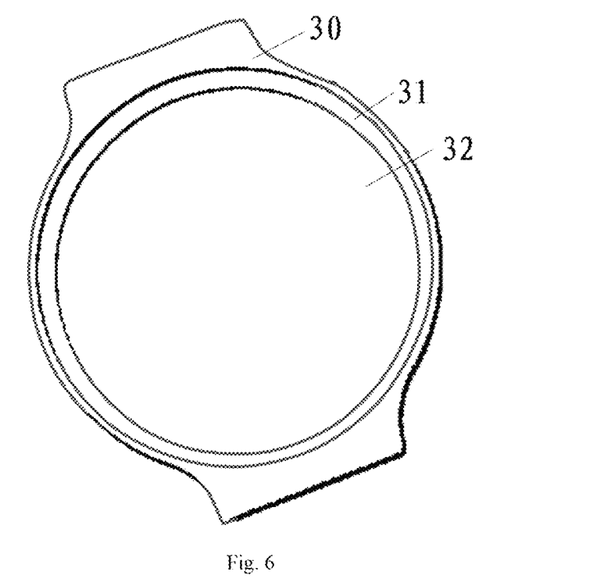
FIG. 6 is a schematic diagram illustrating a structure of the frame.
Figure 7A:
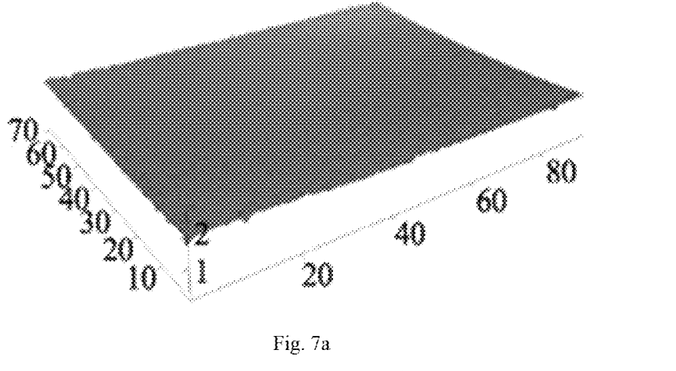
FIG. 7a shows a surface structure of a sunken step after being etched by a KCI etching solution with a mass percentage of 0%.
Figure 7B:
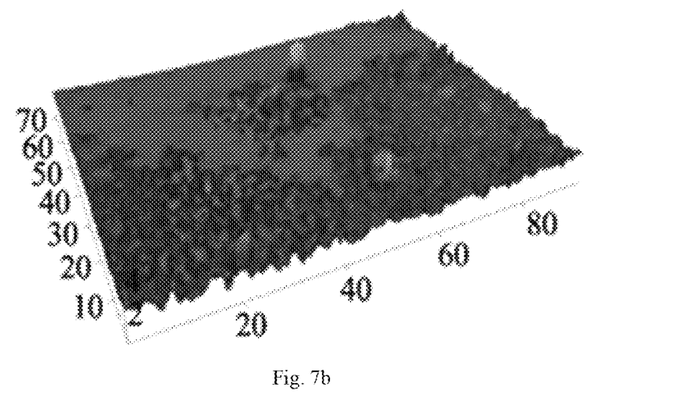
FIG. 7b shows a surface structure of a sunken step after being etched by a KCI etching solution with a mass percentage of 7%.
Figure 7C:
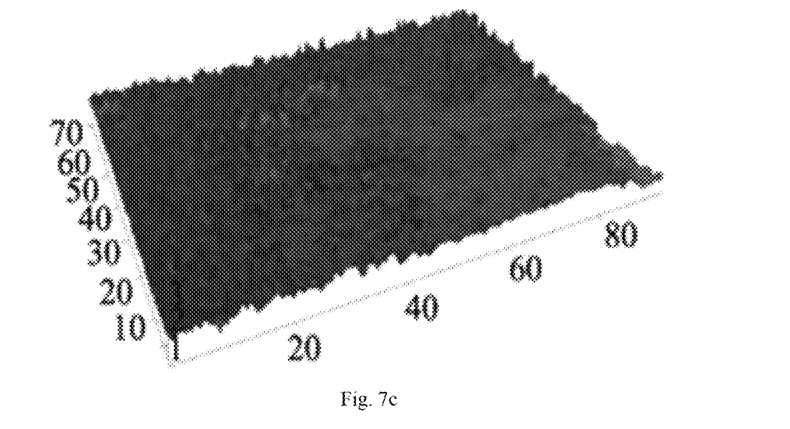
FIG. 7c shows a surface structure of a sunken step after being etched by a KCI etching solution with a mass percentage of 14%.
Figure 7D:
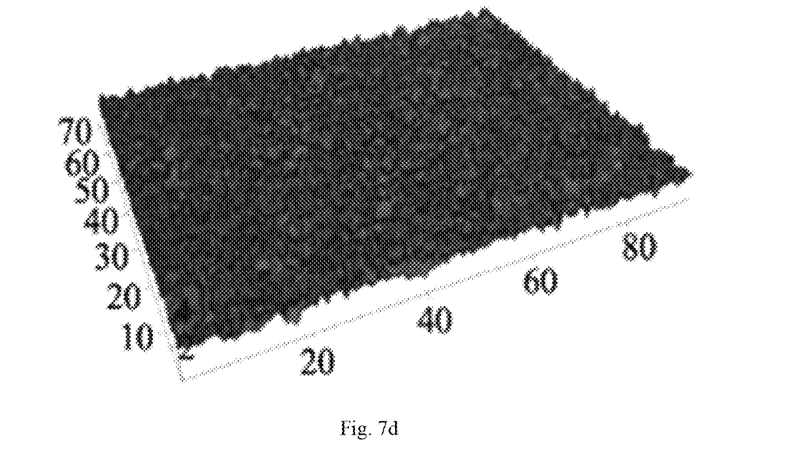
FIG. 7d shows a surface structure of a sunken step after being etched by a KCI etching solution with a mass percentage of 20%.
Figure 7E:
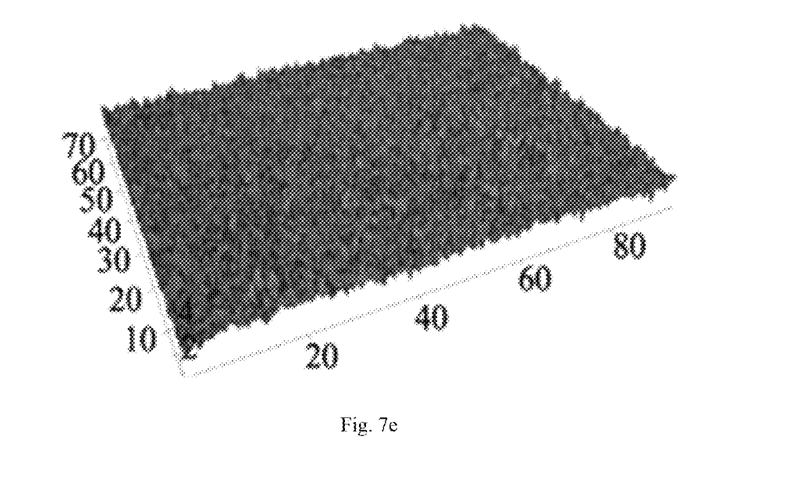
FIG. 7e shows a surface structure of a sunken step after being etched by a KCI etching solution with a mass percentage of 25%.

In an embodiment of the present disclosure, as shown in FIGS. 4 to 6, the display device may further include: a frame 30, wherein the frame 30 has an annular fitting hole 32, an inner side wall of the fitting hole 32 has a limiting step 31, the limiting step 31 is arranged at a periphery of the fitting hole 32, the limiting step 31 may be annular shaped, the frame 30 is arranged on the cover 10 by the fitting hole 32, the limiting step 31 is arranged opposite to the sunken step 11, and an adhesive layer is disposed between a surface of the sunken step 11 and a surface of the limiting step 31 at a side facing the sunken step 11. By bonding the surface of the sunken step 11 to the surface of the limiting step 31 at the side facing the sunken step 11 with the adhesive layer, the fitting between the sunken step 11 and the frame 30 can be tighter, and the tightness can be effectively ensured, and thus the waterproof effect can be improved.

In some embodiments, the surface of the optical transparent region at one side of the cover 10 has a second microstructure, and the second microstructure includes at least one of a second protrusion and a second recess. For example, the second microstructure may include a second protrusion. There may be a plurality of second protrusions and a plurality of second recesses which may be uniformly distributed on the optical transparent region at the one side of the cover 10, and the dyne value of the surface of the optical transparent region at the one side of the cover 10 may be effectively increased by the second microstructure, so that an optical film layer can be closely adhered to the surface of the optical transparent region at the one side of the cover 10.

Optionally, the dyne value of the surface of the optical transparent region at the one side of the cover 10 is greater than or equal to 32 A, so that the optical film layer can be closely adhered to the surface of the optical transparent region at the one side of the cover 10, thereby ensuring stability and robustness.

Optionally, the surface of the optical transparent region at the one side of the cover 10 is provided with an optical film layer 20, and the optical film layer 20 may include an anti-fingerprint film layer or an anti-reflection layer, for example, the optical film layer 20 may be an anti-reflection layer to reduce the reflection of light.

Optionally, the first microstructure may have $K_2SiF_6$ therein. For example, the first microstructure includes a first protrusion 12 and a first recess 13, and the first protrusion 12 may be composed of $K_2SiF_6$. As the $K_2SiF_6$ is relatively stable and cannot be easily damaged, the first microstructure having $K_2SiF_6$ therein may make the first microstructure stable and not easily damaged.

Optionally, a region corresponding to the sunken step 11 at the other side of the cover 10 is provided with an ink layer 21, and the ink layer 21 may serve as a light-shielding layer and prevent light from being transmitted therethrough.

An embodiment of the present disclosure provides a wearable device capable of displaying, including a cover structure. The cover structure including: a cover 10, which is circular, the cover 10 has an optical transparent region and an edge region arranged around a periphery of the optical transparent region, the edge region at one side of the cover 10 having a sunken step 11, the sunken step 11 is arranged around a periphery of the optical transparent region, and the surface of the sunken step 11 has a first microstructure, the first microstructure includes at least one of a first protrusion 12 and a first recess 13. By providing the first microstructure on the sunken step 11, the dyne value of the surface of the sunken step 11 can be increased, so that the fitting between the sunken step 11 and the frame 30 can be tighter, the tightness of the device can be effectively ensured, the waterproof effect can be improved, and the issue of poor sealing effect due to the pollutant on the sunken step surface is addressed.

In some embodiments, the wearable device may further include: a frame 30, wherein the frame 30 has an annular fitting hole 32, the fitting hole 32 has a limiting step 31 at an inner side wall of the fitting hole 32, the limiting step 31 is arranged at a periphery of the fitting hole 32, the limiting step 31 may be annular shaped, the frame 30 is disposed on the cover 10 through the fitting hole 32, the limiting step 31 is arranged opposite to the sunken step 11, and an adhesive layer is provided between a surface of the sunken step 11 and a surface of the limiting step 31 at a side facing the sunken step 11. The surface of the sunken step 11 and the surface of the limiting step 31 at the side facing the sunken step 11 can be adhered by the adhesive layer, so that the sunken step 11 can be tightly fitted to the frame 30. The sealing performance can be effectively ensured, and the waterproof effect can be improved.

While the foregoing is directed to example embodiments of the present disclosure, it will be understood by those skilled in the art that various modifications and adaptations may be made without departing from the principles of the disclosure, and such modifications and adaptations falls within the scope of the disclosure.

What is claimed is:

1. A cover structure, applied to a display device, comprising:

a cover, the cover having an optically transparent region and an edge region disposed around a periphery of the optically transparent region, the edge region at one side of the cover having a sunken step, the sunken step being disposed around the periphery of the optically transparent region, a surface of the sunken step having a first microstructure, the first microstructure comprising a plurality of first protrusions and a plurality of first recesses;

wherein the optically transparent region is configured to enable a display module of the display device to display through the optically transparent region;

wherein a surface of the optically transparent region has a second microstructure, the surface is at one side of the cover away from the sunken step, and the second microstructure comprises a plurality of second protrusions and a plurality of second recesses; and wherein an optical film layer is disposed at one side of the second microstructure away from the sunken step.

2. The cover structure according to claim 1, wherein a dyne value of the surface of the optically transparent region at the one side of the cover is greater than or equal to 32 A.

3. The cover structure according to claim 1, wherein the first microstructure comprising $K_2SiF_6$.

4. The cover structure according to claim 1, wherein an ink layer is disposed at a region corresponding to the sunken step at the other side of the cover.

5. A wearable device capable of displaying, comprising the cover structure according to claim 1.

6. A method for manufacturing a cover structure implemented in a display device, comprising:

providing a substrate, the substrate having an optically transparent region and an edge region disposed around a periphery of the optically transparent region;

forming a sunken step in the edge region at one side of the substrate, the sunken step being disposed around the periphery of the optically transparent region; and forming a first microstructure on a surface of the sunken step, the first microstructure comprising a plurality of first protrusions and a plurality of first recesses;

wherein the optically transparent region is configured to enable a display module of the display device to display through the optically transparent region;

wherein the method further comprises: forming a second microstructure on a surface of the optically transparent region, the surface is at one side of the cover away from the sunken step, and the second microstructure comprises a plurality of second protrusions and a plurality of second recesses; and wherein the method further comprises: disposing an optical film layer at one side of the second microstructure away from the sunken step.

7. The manufacturing method according to claim 6, wherein the step of forming a first microstructure on a surface of the sunken step comprises:

etching the surface of the sunken step with an etching solution to form the first microstructure;

wherein the etching solution comprises hydrofluoric acid, concentrated sulfuric acid, ammonium bifluoride, and ammonium sulfate.

8. The manufacturing method according to claim 7, wherein before the step of etching the surface of the sunken step with an etching solution to form the first microstructure, the method further comprises:

forming a protective layer on the optically transparent region at a side of the substrate;

after the step of etching the surface of the sunken step with an etching solution to form the first microstructure, the method further comprises: removing the protective layer.

9. The manufacturing method according to claim 7, wherein a mass ratio for the hydrofluoric acid, the concentrated sulfuric acid, the ammonium bifluoride and the ammonium sulfate in the etching solution is in (2-4):(2-4):(4-7):(0.5-2).

10. The manufacturing method according to claim 9, wherein the etching solution further comprises:

an inorganic salt, the inorganic salt comprising at least one of a sodium salt and a potassium salt, wherein a mass percentage of the inorganic salt in the etching solution is in a range of 3% to 30%.

11. The manufacturing method according to claim 6, wherein before the step of etching the surface of the sunken step with an etching solution to form the first microstructure, the method further comprises:

polishing the surface of the sunken step.

12. The manufacturing method according to claim 6, further comprising:

forming an ink layer in a region corresponding to the sunken step at the other side of the substrate.

13. A display device, comprising a cover structure, the cover structure comprising:

a cover, the cover having an optically transparent region and an edge region disposed around a periphery of the optically transparent region, the edge region at one side of the cover having a sunken step, the sunken step being disposed around the periphery of the optically transparent region, a surface of the sunken step having a first microstructure, the first microstructure comprising a plurality of first protrusions and a plurality of first recesses;

wherein the optically transparent region is configured to enable a display module of the display device to display through the optically transparent region;

wherein a surface of the optically transparent region has a second microstructure, the surface is at one side of the cover away from the sunken step, and the second microstructure comprises a plurality of second protrusions and a plurality of second recesses; and wherein an optical film layer is disposed at one side of the second microstructure away from the sunken step.

14. The display device according to claim 13, further comprising a frame, wherein the frame has an annular fitting hole, an inner side wall of the fitting hole has a limiting step, the limiting step is arranged around a periphery of the fitting hole, the frame is disposed on the cover through the fitting hole, the limiting step is arranged opposite to the sunken step, and an adhesive layer is disposed between a surface of the sunken step and a surface of the limiting step at a side facing the sunken step.

15. The display device according to claim 13, wherein, a dyne value of the surface of the optically transparent region at the one side of the cover is greater than or equal to 32 A.

16. The display device according to claim 13, wherein, the first microstructure comprising $K_2SiF_6$; and/or an ink layer is disposed at a region corresponding to the sunken step at the other side of the cover.

* * * * *